United States Patent Office 3,480,507
Patented Nov. 25, 1969

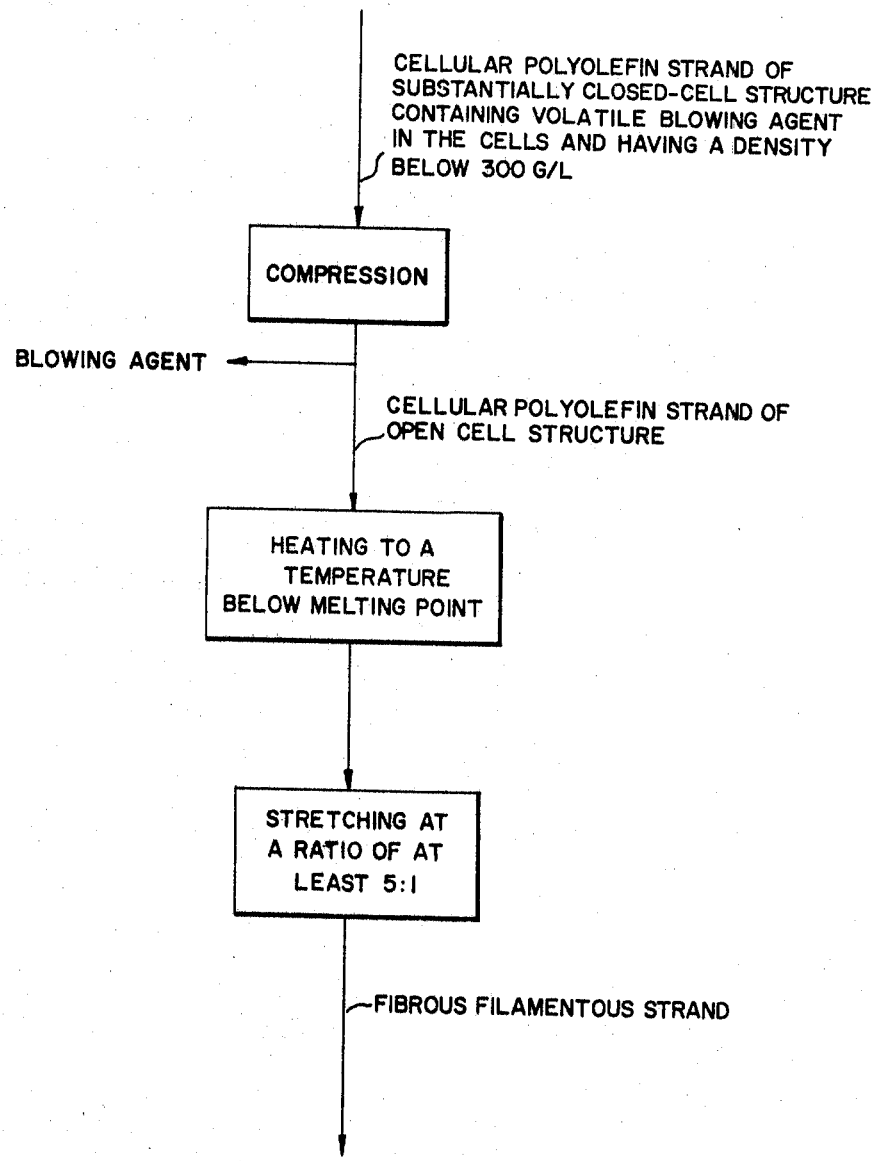

3,480,507
PROCESS FOR THE PREPARATION OF FIBROUS, FILAMENTOUS PRODUCTS AND THE RESULTANT PRODUCT
Lam H. Gouw, Josef H. Voncken, and Hans Frielingsdorf, Delft, Netherlands, and Gene W. Powers, Woodbury Heights, N.J., assignors to Shell Oil Company, New York, N.Y., a corporation of Delaware
Filed Aug. 25, 1966, Ser. No. 574,932
Claims priority, application Netherlands, Sept. 2, 1965, 6511455
Int. Cl. B29h 7/20; B29c 25/00
U.S. Cl. 161—178                                6 Claims

ABSTRACT OF THE DISCLOSURE

An improved process is provided for the production of fibrous filamentous strands or plexifilaments from polyolefins. The method comprises extruding a mixture of polyolefin and blowing agent to form strands of low density foam, compressing the strands to convert them from a closed-cell to an open-cell structure and thereafter stretching the strands to at least five times their original length to produce plexifilaments suitable for textile uses and the like.

---

The invention relates to the preparation of fibrous, filamentous products by stretching strips or strands of foam of predominantly stereospecific polyolefins, in particular polypropylene.

A process for the preparation of foamed cellular filaments by stretching foamed polyolefins is known from British Patent 927,582 and equivalent U.S. 3,214,234 to Bottomley. It was found, however, that the processes of these patents do not yield satisfactory results when the density of the foam before stretching is below 300 g./l. At these low densities it is not possible to stretch the foam, as extruded, in the desired ratios since breaking repeatedly occurs.

While foams of higher density can be stretched without an intervening treatment, as described in said patents, they result in production of cellular filaments and not the fibrous filaments which are the desired product of this invention.

It has now been found that a regular, strong fibrous filamentous product can be obtained from strips or strands of foamed, predominantly stereospecific polyolefins and particularly polypropylene having densities substantially below 300 g./l., if the foamed strips or strands are compressed to no more than half their original thickness before being stretched.

Strips or strands are the appropriate form in which the foam is predominantly suitable for being subjected to treatment according to this invention. In general, the length of these strands is at least 20 times the width and the thickness. The process according to the invention is preferably applied to "endless" strips or strands of polyolefin foams obtained by extrusion.

The invention is further illustrated by the drawing, in which the sole figure is a schematic representation of the invention.

While this invention is applicable to various stereospecific polyolefins, it is of primary interest in the production of foamed filamentous articles from stereoregular, and particularly from predominantly isotactic polypropylene, for which methods of preparation and properties are now well known. Polypropylene of commerce is suitable for use in this invention.

The starting foam is prepared in any known manner including the methods described in the above patents. Suitable are processes in which the foam is extruded from an extruder in which a volatile liquid, generally a hydrocarbon, such as propane, butane or pentane or a halogen compound, for example, trichlorofluoromethane is injected as blowing agent into the polyolefin. According to other methods, inert gases, such as nitrogen or carbon dioxide, are used as blowing agents. Inert gases can also be formed in the polyolefin mass by a chemical reaction, for example by decomposing certain organic nitrogen compounds, some of which are commercially available blowing agents, or by reacting sodium bicarbonate with a solid acid, such as tartaric acid. It is often very favorable to use a chemical blowing agent which decomposes to emit a gas, for example, a nitrogen compound, together with a volatile liquid. It is, however, easier to obtain a foam having a low density by evaporating a volatile liquid than by means of a blowing agent formed by a chemical reaction.

According to the invention, it is a low-density (below 300 g./l.) polyolefin foam in particular which results in an attractive fibrous filamentous product after compression and stretching. The resulting filament or strand is composed of longitudinally oriented, elongated, locally branched structural fibrous elements which are interconnected to a great extent by likewise longitudinally oriented branchings. Thus, this product possesses a structure which may be described as fibrous. On the other hand, when stretching a polyolefin foam having a high density, a product is obtained in which the original cellular structure is still present in elongated form. With products of equal strength, the one prepared from the polyolefin foam having the lower density is highly advantageous both because of its lower weight per unit of length and of its fibrous character.

While this invention is not to be limited by any theory, it is thought that the beneficial effect of the compression step is due to removal of a substantial part of the blowing agent trapped in the cells of the extruded foam strand. During the compression step the foam is in nonplastic condition, i.e., it is hardened or solidified at least to the extent that the cell walls do not weld together. Compression under these conditions is believed to result in partial or complete rupture of the cell walls, permitting escape of the blowing agent. Surprisingly, the cellular filament with ruptured walls is much more resistant to breakage during the subsequent stretching step than is a closed-cell filament.

The polyolefin foam can expand again after the compression and before the stretching step. It need only be compressed for a limited period of time. The compression time involved in passing the foam between a set of rollers, the length of which is in the order of 0.1 to 10 seconds, is generally sufficient.

The advantages of the process according to the invention are greatest when starting from a polypropylene foam having a density between 50 and 150 g./l. Strands of still lower density, e.g., 40 to 45 g./l., may be converted.

The thickness to which foam strips or strands are compressed prior to stretching, according to this invention, is no more than half of the thickness of the original foamed strip or strand. Because of the greater effect, it is preferred to compress the foam to no more than one-fourth the original thickness. A compression ratio of 10% of original thickness may be employed.

The stretching ratios must be chosen in dependence on the nature, in particular the density, of the foam, and the pretreatment, i.e., the degree of compression and the heating, if any. These factors determine what stretching ratios are required to convert the cellular structure into the fibrous structure and also what stretching ratios yield the most favorable results. These most favorable stretching ratios can be easily found experimentally in each case. These factors also determine the maximum stretching ratios, viz. the stretching ratio above which breaking or weak spots will occur.

Suitable stretching ratios are generally above 5:1, for example, between 10:1 and 20:1.

Compression, heating and/or stretching can be effected in stages, if desired.

The results of the process according to the invention can in many cases be further improved by maintaining the polypropylene foam article for some time before stretching at a temperature between 130° C. and the melting point. The melting point is generally between 165° and 170° C. This heating may be effected before, during and/or after compression of the foam. Foams obtained by extrusion usually have a temperature considerably below 130° C. and have therefore to be heated in order to raise the temperature to between 130° and 170° C. In some instances stretching is effected at temperatures below 130° C., so that in those cases the material is heated, allowed to cool again, and then stretched. In order to exert an appreciable influence, the period of time during which the material is at a temperature between 130° C. and the melting point must be sufficiently long. The higher the temperature, the shorter will be this period of time. A noticeable improvement may occur when the material is heated for several seconds, e.g., between 1 second and 5 minutes, to a temperature between 130° C. and 170° C. It is believed that the improvement resulting from this heating is due to the reduction in orientation of the molecules in the cell walls, which orientation may be the result of extrusion at relatively high expansion ratios. A suitable apparatus for heating to temperatures between 130° and the melting point is a tube or tunnel through which the foam is passed and in which it is in contact with a hot gas.

The fibrous, filamentous products which are obtained according to the invention show a high volume per unit of weight. This property is of great importance for the manufacture of light-weight fabrics, which, in other properties and appearance, strongly resemble fabrics manufactured from heavier filaments. In this connection the invention is also considered to be embodied in fabrics which are completely or partly composed of the fibrous, filamentous products obtained according to the invention. What is said here in relation to fabrics also applies to non-woven fabrics, viz. structures which are not produced by weaving, but by interconnecting, in a manner other than weaving, loose fibers or filaments spread out to form a flat surface, these loose fibers or filaments being completely or in part the fibrous, filamentous products which are obtained according to the invention.

Staple fibers can be isolated from the fibrous filamentous products obtained according to the invention in a suitable manner by separating out, viz. by such operations as cutting, breaking, tearing, or rubbing. The staple fibers can be worked up by twining to yarns of very great strength. Because of their coarse, fibrous nature the staple fibers according to the invention obtained in this way are more suitable for the manufacture of yarns than the known staple fibers which are artificial fibers with smooth surface and which need a very strong twine.

EXAMPLE 1

To obtain the foam, use was made of an extruder having an inside cylinder shell diameter D=60 mm. and a length (from the feed inlet for the polymer to the extrusion orifice) of 32D. This length was divided into a transport zone (14½D), a compression zone (1D) of which the cross-section available for the polymer gradually diminished in the direction of the extrusion orifice to ⅓ of the cross-section available in the transport zone, a pumping or "metering zone" (5D) of constant diameter, a constricted part or "blister" (1½D) and a mixing zone (10D) for mixing the polymer with a blowing agent. In the transport zone, the compression zone and the pumping zone the rotating shaft had the form of a worm screw. In the mixing zone this shaft was provided with a number of collars having helical grooves. The extrusion die orifice had a diameter of 2 mm.

The polymer was isotactic polypropylene with a melt index of 2–4. 0.5% by weight (based on polymer) of azodicarbonamide was introduced into the feed inlet simultaneously with the polypropylene. At the beginning of the mixing zone 5% by weight (based on polymer) of n-pentane was injected into the mass.

Partly as a result of friction, the temperature at the end of the metering zone was 220° C. Further on in the extruder the temperature gradually diminished. The mixture issuing from the extrusion orifice had a temperature of 164° C. A foamed strand having a diameter of 5 mm. and a weight per liter of 240 g., was obtained in a yield of 7 kg./hr.

The strand was flattened, i.e., compressed, between a set of driven, unheated rollers and then wound up on a reel. The distance between the rollers was 1 mm.

The strand was later passed through a 1.5 m. long oven in which the temperature of the strand was raised to 130° C. by heated air. The temperature of the air was 150° C. At the beginning of the oven the strand was unwound from the reel and passed over guide rollers positioned immediately before the oven, which rollers had a speed of 5 m./min. At the end of the oven the strand was drawn off by a set of rollers with a speed of 30 m./min. Consequently, the stretching ratio was 6:1. From the final roller, the strand was passed to a final take-up reel.

During this stretching the foamed structure passed into a fibrous structure. The cross-section contained approximately 100 fibers of an average of 10 denier (10 g./9000 m.). The average cross-section of the elementary fibers was 40 microns.

If compression was omitted, break invariably occurred at stretching ratios above 3:1.

When a foamed strand having a weight of 350 g. per liter was stretched, a strand with stretched cellular structure (not a fibrous structure) and a weight of 450 g. per liter (which shows the high compactness) was obtained in an oven as described above at a stretching ratio of 9:1 (speed before entry to the oven 5 m./min., speed after leaving the oven 45 m./min.).

EXAMPLE 2

The test described in Example 1 was repeated, but with the following modifications: only 0.25% of azodicarbonamide was used. The liquid blowing agent was n-butane. The highest temperature in the extruder was 225° C.

The foamed strand had a weight per liter of 105 g. and the yield was 5 kg./hr. The cell diameter varied from 0.1 to 0.5 mm. Some of the cells were closed, others had openings in the walls.

This foam only needed to be compressed from a thickness of 5 mm. to 2.3 mm. to become readily stretchable.

The following table states the stretching ratios that can be reached at some oven air temperatures (other conditions than in Example 1).

| Air temperature in oven, °C.: | Stretching ratio |
|---|---|
| 140 | 6:1 |
| 150 | 8:1 |
| 160 | 11:1 |

A fibrous product was obtained which corresponded to that of Example 1 in structure and properties.

If the foam was compressed to 70% of the original thickness instead of to 46% of the original thickness, break invariably occurred at a stretching ratio above 3:1 at various stretching temperatures.

EXAMPLE 3

A polypropylene foamed strand having a diameter of 10 mm. and a weight per liter of 45 g. was flattened to 20% of the original thickness. The foam was stretched in ratios of from 9:1 to 14:1 at oven air temperatures (see Example 1) of 140° to 155° C., as a result of which invariably fibrous products formed. The input rate into the oven was always 5 m./min.

The following table summarizes some properties modified by stretching. During stretching the temperature in the strand was 120° C.

|  | Weight per liter, g. | Denier, g./9,000 m. | Tenacity, g./denier | Elongation at break, percent | Tensile impact strength, g./cm., denier |
|---|---|---|---|---|---|
| Before stretching | 45 | 6,860 | 0.45 | 390 | 0.26 |
| After stretching at 9:1 ratio | 200 | 1,045 | 4.00 | 20 | 2.00 |

The bundle of fibers produced from the strand contained an average of 600 fibers averaging 3 denier.

Although the term "strand," as referring to the solidified extrudate, is sometimes particularly used to refer to foamed bodies of rounded, generally circular cross section, obtained directly by extrusion of foamable melt through an orifice of circular cross-section, it is used in this specification and the claims in reference both to such directly extruded strands and to strips of similar dimensions which may be formed, for example, by cutting an extrudate of greater width. The strands may range from 1 mm. or less to 15 mm. or more cross-sectional dimension. The length is at least 20 times the width and thickness, and the strands are preferably continuous, i.e., substantially "endless."

The fibrous filamentous articles of this invention may be designated plexifilaments, since their internal structure is a three-dimensional plexus consisting of a multitude of essentially longitudinally extended interconnected fibrous elements or film-fibrils. As illustrated in Examples 1 and 3, plexifilaments produced according to this invention may contain an average of the order of fifty filaments per millimeter of original strand thickness.

The temperature of the foamed strand during the compression step is not critical, provided it is sufficiently below the melting point so that the cell walls will not adhere to each other to a substantial extent when brought into contact with each other by the compressing means. For convenience, this will be designated as being below the "sticking temperature"; this is readily determined by simple experiment. The compression stpe can be suitably carried out on polypropylene foam strands at about room temperature, or, generally, at temperatures between 15° and 130° C.

We claim as our invention:

1. A process for producing fibrous filamentous polyolefin products which comprises forming a strand of cellular predominantly stereospecific polyolefin consisting of the solidified extrudate of a molten mixture of said polyolefin and a blowing agent, said strand having a density of less than 300 grams per liter and a substantially closed-cell structure; compressing said strand, while in non-plastic condition, to no more than half of its original thickness for at least one tenth of a second, the conditions for said compression being selected to convert said strand to a predominantly open-cell structure; and thereafter, while said strand is no longer under compression, stretching said strand to a sufficiently high ratio above about 5:1 to convert said strand to a plexifilament consisting of a multitude of essentially longitudinally extended interconnected fibrous elements.

2. The process according to claim 1 wherein said polyolefin is predominantly isotactic polypropylene.

3. The process according to claim 2 wherein said strand, after extrusion and solidification, has a density in the range from 50 to 150 grams per liter, 4. The process according to claim 3 wherein said strand is compressed to no more than one fourth of its original thickness.

5. The process according to claim 2 wherein said strand, prior to stretching, is heated to a temperature above about 130° C. but below its melting point for a time in the range between 1 second and five minutes, and wherein said strand is at a temperature in the range from 80° to 130° C. during the stretching step.

6. Fibrous filamentous polyolefin product produced according to the method of claim 1.

References Cited

UNITED STATES PATENTS

| 3,118,161 | 1/1964 | Cramton | 264—54 XR |
| 3,214,234 | 10/1965 | Bottomley | 264—54 XR |
| 3,334,169 | 8/1967 | Erceg et al. | 264—51 XR |
| 2,985,503 | 5/1961 | Becker | 264—147 XR |
| 3,335,560 | 8/1967 | Ichikawa. | |
| 3,403,203 | 9/1968 | Schirmer | 264—321 XR |
| 3,405,516 | 10/1968 | Laureti. | |

FOREIGN PATENTS 911,995  12/1962  Great Britain.

OTHER REFERENCES

"Orientated Plastics Foams." In Rubber and Plastics Age, vol. 43, No. 2, February 1962, p. 141, copy in 264—46.

PHILIP E. ANDERSON, Primary Examiner

U.S. Cl. X.R.

28—72; 260—2.5; 264—50, 53, 54, 234, 290, 321, 345